May 29, 1962 R. W. HOUSER ET AL 3,036,470
THERMOSTAT CONTROL
Filed Aug. 28, 1959 3 Sheets-Sheet 1

May 29, 1962 R. W. HOUSER ET AL 3,036,470
THERMOSTAT CONTROL

Filed Aug. 28, 1959 3 Sheets-Sheet 3

United States Patent Office 3,036,470
Patented May 29, 1962

3,036,470
THERMOSTAT CONTROL
Roy W. Houser, Anaheim, and Harold W. Rice, Playa del Rey, Calif., assignors to Robertshaw-Fulton Controls Company, Richmond, Va., a corporation of Delaware
Filed Aug. 28, 1959, Ser. No. 836,808
7 Claims. (Cl. 74—3.52)

This invention relates to a clock thermostat that is adapted to maintain one temperature during the day and a reduced temperature during the night. More particularly, this invention is directed to a means for interrupting the normal cycle of a clock thermostat.

Many prior art devices have included means for automatically controlling the operating cycles of thermostats between two separate set points. These devices have also provided selecting means for interrupting the cycle temporarily with either a manual or automatic cancellation of the interrupting means after a predetermined time. However, these devices have involved a large number of parts, comparatively complicated designs, a possibility of friction slowing the timing mechanism, or an inconvenient means of control of the interrupting means.

An object of this invention is to selectively interrupt the cycling of the control point of a thermostat without disturbing the cycling means.

Another object of this invention is to manually cancel the interrupting means so that the normal cycling continues as though no interruption had taken place.

Another object of this invention is to automatically cancel the interrupting means, if previously applied and not manually cancelled, at some point in the normal cycle so that the normal cycle will thereafter continue as though no interruption had occurred.

Still another object of this invention is to prevent drag on the timing mechanism by operation of the interrupting means.

A further object of this invention is to dispose the interrupting means in an easily visible and manually operable position.

In the preferred embodiment of this invention, a lever means is mounted for movement between a pair of predetermined positions. A cam means is operatively connected to the lever means and has a primary portion for moving the lever means to one of the predetermined positions and a secondary portion for moving the lever means to the other of the predetermined positions. A timing means operates the cam means so that the lever means is maintained in the first predetermined position for a first predetermined interval of time and maintained in the second predetermined position for a second predetermined interval of time. An interrupting means is provided to engage the lever means to hold the same in the first predetermined position during the second predetermined interval of time.

These and other objects and advantages of this invention will become apparent from the following detailed description taken in connection with the accompanying drawings wherein.

Figure 7:
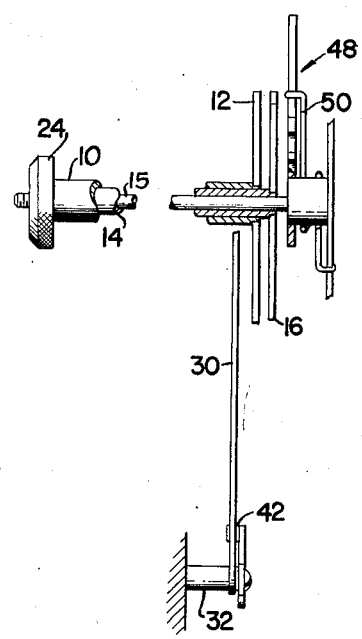
FIG. 7 is a somewhat schematic illustration of the features of this invention.
Figure 8:
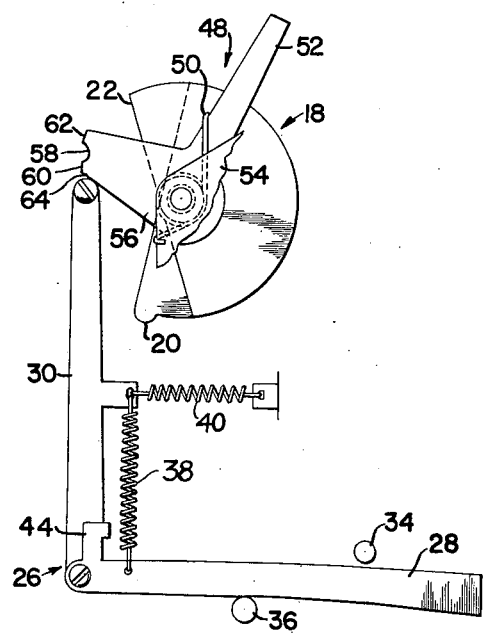
FIG. 8 is a similar schematic illustration taken from another direction than that shown in FIG. 7.

Referring more particularly to the drawings and first to the simplified schematic illustration shown in FIGS. 7 and 8, a hollow clock driven shaft 10 is provided with a flat disc 12 rigidly secured adjacent one end thereof. Another hollow shaft 14 is positioned within hollow shaft 10 and extends coaxially therewith. The ends of shaft 14 protrude from the hollow shaft 10 and a second flat disc 16 is attached to shaft 14 adjacent the flat disc 12. Another shaft 15, which is positioned within hollow shaft 14, protrudes from shaft 10 and serves to support shafts 10 and 14. The discs 12 and 16 are of substantially semicircular shaped configuration and are pivoted about their center of curvature. The periphery of the discs 12 and 16 form a first cam portion 18. The flat discs 12 and 16 being of the same radius are substantially similar except that a projection 20 is provided on disc 12 adjacent the end of the curved portion thereof for a purpose to appear hereinafter.

The discs 12 and 16 are rotatable relative to each other and are cooperable to form a depression 22. As the disc 16 is rotated relative to disc 12, the size of depression 22 is varied. This depression 22 provides a second cam portion, the size of which is progressively increased as the disc 16 is rotated relative to disc 12. As the size of the second cam portion 22 is increased, the size of the first portion 18 is accordingly decreased. When the cam portions are at the desired size, a knurled nut 24 is threaded on the opposite end of shaft 15 and engages hollow shafts 10 and 14 to lock the two together.

Lever means 26 is provided for engagement with the above recited cam means and is adapted to shift the control point of a thermostat from one point to another. More particularly, first and second elongated members 28 and 30 are pivotally mounted on pin 32. Elongated member 28 is adapted for pivotal movement between abutment means 34 and 36 provided on either side thereof. The position of the elongated member 28 is adapted to adjust the control point temperature of a thermostat (not shown). In this arrangement, coil spring 40 positions the elongated lever 28 against abutment means 36 when the second cam portion 22 controls the position of roller 46. Also, in this arrangement of coil springs, coil spring 38 positions the elongated lever 28 against abutment means 34 when the first cam portion 18 controls the position of roller 46 or when the interrupting means 48—152 is in engagement with the roller 46. The free end of elongated member 30 is provided with a roller 46 rotatably mounted thereon and extending at right angles thereto. The roller 46 is adapted to successively engage the first cam portion 18 and the second cam portion 22.

When roller 46 is in engagement with the first cam portion 18, elongated member 30 is held out of engagement with lug 42 of elongated member 30 thereby permitting coil spring 38 to urge the elongated member 28 into engagement with abutment means 34. Thus, as long as the roller 46 engages the first cam portion 18, the thermostat will be set at the first predetermined temperature. As the timing means rotates the discs 12 and 16 in a clockwise direction, roller 46 engages the depression or cam portion 22 permitting coil spring 40 to rotate elongated member 30 in a clockwise direction to engage lug 42 of elongated member 28. Since coil spring 40 is stronger than coil spring 38, elongated member 28 will be rotated into contact with abutment means 36 to set the control point temperature at a second predetermined value.

An interrupting means 48 is provided to selectively maintain the control point at the first predetermined temperature during the time cycle in which the thermostat is normally at the second predetermined temperature. This interrupting means 48 takes the form of a lever of substantially right angular configuration pivotally mounted on shaft 15. A torsion spring 50 has one end engaging leg 52 of the lever and the other end connected to a suitable support 54 to normally urge the lever in a clockwise direction to hold the other leg 56 out of engagement with roller 46. An indentation or notch 58 is disposed on the end of leg 56 and is positioned a sufficient radial distance from shaft 14 to hold the roller 46 out of engagement with the first cam portion 18. The lower lip 60 of indentation 58 is disposed a radial distance from shaft 14 less than the projection 20 on disc 12 so that the projection 20 will lift the roller 46 out of indentation 58 upon engagement therewith. The upper lip 62 of indentation 58 extends a radial distance beyond the lower lip 60 to prevent the interrupting means 48 from being rotated past the roller 46. A cam surface 64 is provided on the interrupting means 48 adjacent the lower lip 60 to guide the roller 46 into indentation 58 upon operation of the interrupting means regardless of whether the roller 46 is in engagement with the first cam portion 18 or the second cam portion 22.

At any stage in the timing cycle, the interrupting means 48 may be manually rotated to move the indentation 58 into engagement with the roller 46 so that the thermostat will continuously operate at its first predetermined control point. If the interrupting means is not manually cancelled, it will be automatically cancelled as the roller 46 is lifted out of indentation 58 by the projection 20.

Referring now more particularly to the specific embodiment of this invention illustrated in FIGS. 1 through 6, the control device takes the form of a clock thermostat indicated generally at 66. The clock thermostat 66 comprises a substantially square support 68 having a rectangular shaped cover 70 with a lower face 72 disposed thereon. Switching means 74 is mounted on the support 68 and is connected to an external circuit (not shown) containing an appropriate conditioning apparatus. Operation of the switching means 74 is controlled by the position of a permanent magnet 76 mounted on one end of a sinusoidal bimetallic power element 78. The other end of the bimetallic power element 78 is fixedly attached to an outwardly extending U-shaped portion 80 of a bracket indicated generally at 82. The bracket 82 is pivotally mounted on pin 84 and includes an elongated member 86 extending across the bottom of support 68 substantially parallel to the bimetallic power element 78. Bracket 82 also includes another arm having a lug 88 extending outwardly into the path of an elongated member 90 which is also pivotally mounted on pin 84.

An arm 92 extends from elongated member 90 and mounts one end of a coil spring 94. The other end of coil spring 94 is attached to elongated member 86 and serves to urge the bracket 82 in a counterclockwise direction about pin 84. Counterclockwise movement of bracket 82 is limited by engagement of the upper surface of elongated member 86 with an abutment means 96. Abutment means 96 is slidable laterally on a track 98 provided across the bottom of support 68 and includes a pointer for indicating a temperature on a scale 100 disposed on the lower face 72 of cover 70. Another coil spring 102 has one end mounted on arm 92 of elongated member 90 and the other end suitably attached to the support 68 to urge elongated member 90 in a clockwise direction about pin 84. This clockwise rotation causes elongated member 90 to abut the lug 88 transmitting clockwise rotation to bracket 82 which is limited by engagement of the lower surface of elongated member 86 with another abutment means 104 disposed on track 98 and having a pointer for indicating a temperature on the scale 100.

The angular position of the bracket 82, as limited by abutment means 96 or 104, determines the temperature at which the bimetallic power element 78 will have exactly the correct curvature to place the magnet 76 at the critical position to operate the switching means 74. Thus, it is apparent that the angular position of the bracket 82 is translated into the temperature set point for the thermostat.

Means is provided for automatically shifting the control point temperature of the thermostat between values indicated by abutment means 96 and 104. To this end, a timing means indicated generally at 106 is suitably mounted on support 68. The clockwork gears of the timing means 106 are mounted between a pair of spaced hexagonal-shaped plates 108, 110 and the clockwork drives a gear 112 which is connected to a main shaft 114 (FIG. 5) and rotates the same on a twenty-four hour cycle. A reduced end 116 of main shaft 114 has a portion extending into a suitable aperture provided in hexagonal plate 108 to rotatably mount the main shaft 114. A bushing 118 is attached to hexagonal plate 110 and extends outwardly therefrom to cooperate with an enlarged portion 120 of main shaft 114 to guide rotational movement. End 122 of main shaft 114 extends through support 68 and is threaded to receive a nut 124. A circular adjustment plate 126 having suitable indicia 128 disposed thereon is keyed to end 122 of the main shaft 114 and rotates therewith.

A sleeve 130 composed of a pair of interlocking sections is disposed about the main shaft 114. A partially circular cam plate 132 is attached to one end of sleeve 130 and is adapted to engage a shoulder formed by the enlarged portion 120 of main shaft 114. The other end of sleeve 130 extends through support 68 and has a pointer 134 attached thereto. The pointer 134 extends beneath adjustment plate 126 and has the outer end hooked above the adjustment plate to indicate a time thereon. Another sleeve 136, also composed of two interlocking sections, is disposed about sleeve 130 and extends coaxially with main shaft 114. A partially circular cam plate 138 is attached to one end of sleeve 136 and is slidably engageable with cam plate 132. An arcuate slot 140 is disposed in cam plate 138 and cooperates with a key 142 extending from cam plate 132 to guide relative movement between the cam plates. The other end of sleeve 136 also extends through support 68 and has a pointer 144, similar to pointer 134, attached thereto. Pointer 144 indicates another time on the indicia 128 of adjustment plate 126.

Cam plates 132 and 138 are cooperable with each other, in a manner similar to cam plates 12 and 16 of FIGS. 7 and 8, to form a first cam portion 146 along the periphery of the cam plates and a depression or second cam portion 148 formed by the incomplete portion of the circle. When nut 124 is tightened, sleeves 130 and 136 are compressed against the shoulder formed by the enlarged portion 120 on main shaft 114 and the sleeves and cam plates 132 and 138 rotate with the main shaft 114 as a unit. A roller 150 (FIGS. 3 and 4) extends from elongated member 90 and is adapted to successively engage the first cam portion 146 and the second cam portion 148 to switch the control point temperature between the above recited first predetermined value and second predetermined value.

An interrupting means 152 is provided to selectively maintain the control point at the first predetermined temperature during the time cycle in which the thermostat is normally at the second predetermined temperature. Interrupting means 152 is similar to interrupting means 48 of FIGS. 7 and 8 and takes the form of a bell crank lever of substantially right angular configuration pivotally mounted about the enlarged portion 120 of main shaft 114. A torsion spring 154 is disposed about bushing 118 and has one end engaging leg 156 of the lever and the other end connected to hexagonal plate 110 to normally urge the lever in a clockwise direction to hold the other leg 158 out of engagement with roller 150. An indentation or notch 160 is disposed on the end of leg 158 and is positioned a sufficient radial distance from main shaft 114 to hold the roller 150 out of engagement with the first cam portion 146. The lower lip 162 of the indentation 160 is disposed a radial distance from main shaft 114 less than a projection 164 (FIG. 4) formed on cam plate 132 so that the projection will lift the roller 150 out of indentation 160 upon engagement therewith. The upper lip 166 of indentation 160 extends a radial distance beyond the lower lip 162 to prevent the interrupting means 152 from being rotated past the roller 150. Cam surface 168 provided on the interrupting means 152 adjacent the lower lip 162 guides the roller 150 into indentation 160 upon operation of the interrupting means regardless of whether the roller 150 is in engagement with the first cam portion 146 or the second cam portion 148.

Figure 1:
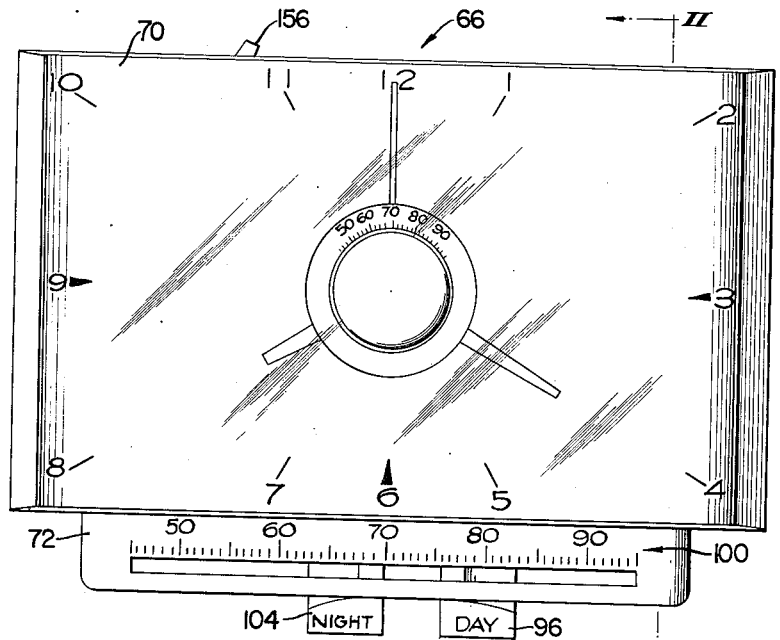
FIG. 1 is a front elevation of the control device embodying this invention.
Figure 2:
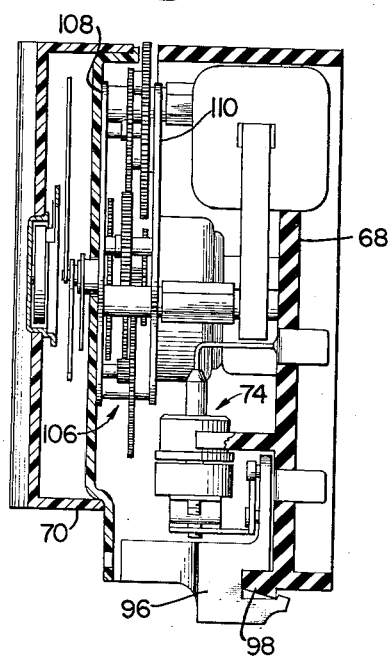
FIG. 2 is a cross-section taken on line II—II of FIG. 1.
Figure 3:
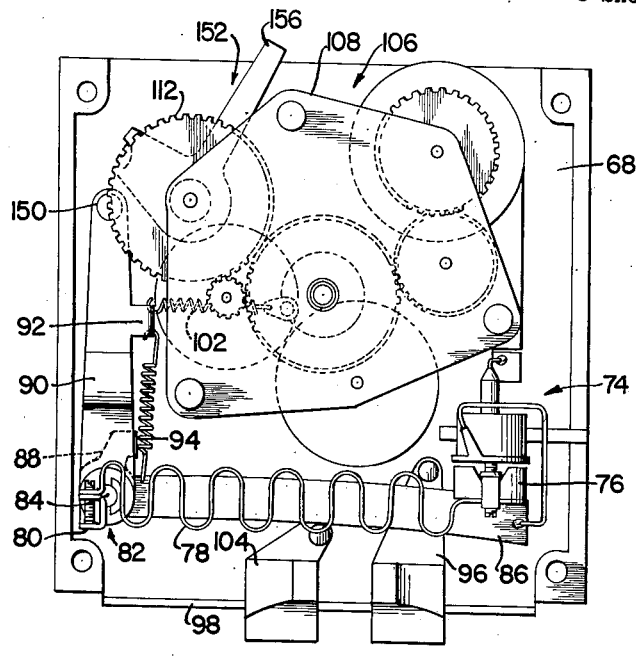
FIG. 3 is a view similar to FIG. 1 with the cover of the device removed.
Figure 4:
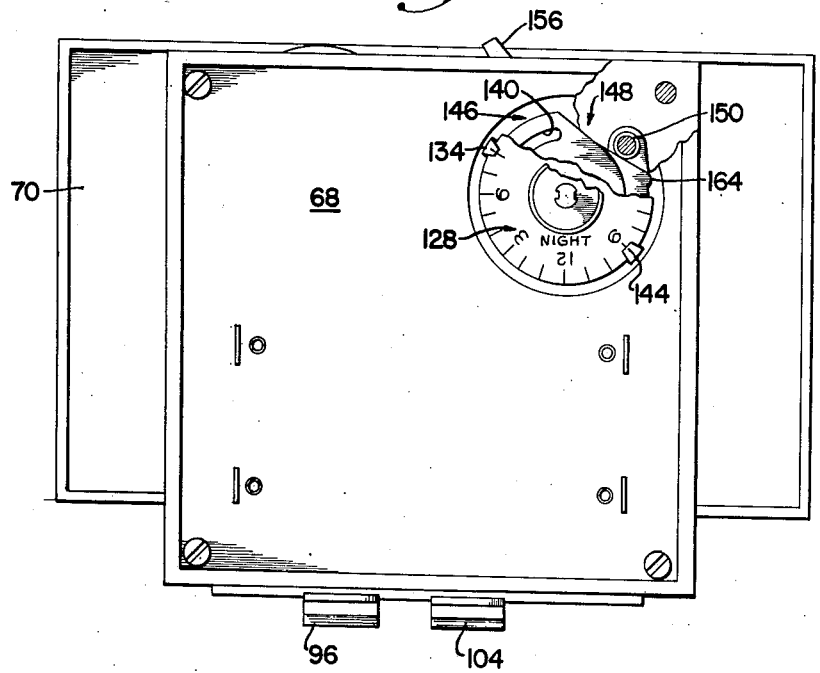
FIG. 4 is a rear elevation of the device shown in FIG. 1 with portions cut away to reveal the adjusting mechanism.
Figure 5:
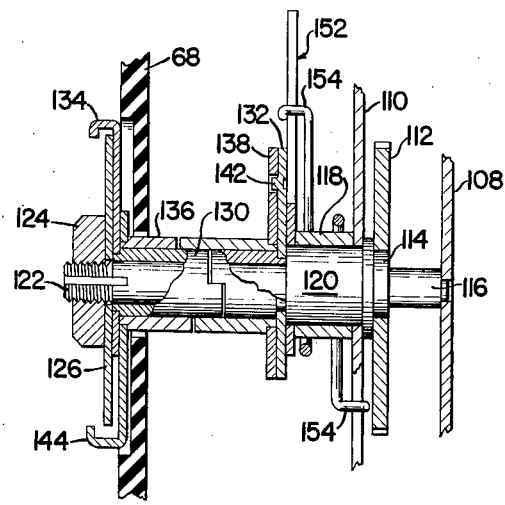
FIG. 5 is a partial sectional view of a detail on an enlarged scale.
Figure 6:
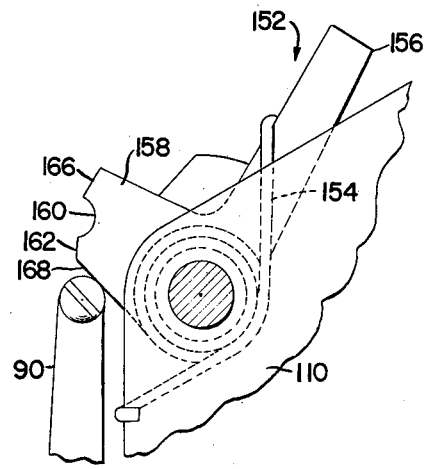
FIG. 6 is an elevation of the detail shown in FIG. 5.

In operation of the embodiment illustrated in FIGS. 1 through 6, abutment means 96 and 104 are moved laterally along scale 100 to indicate any desired temperature such as 70° and 76° as illustrated in FIG. 1. The control device 66, normally mounted on a wall by any suitable means such as by plugs, is removed to expose the adjusting means on the back thereof (FIG. 4). Nut 124 is then loosened and pointers 134 and 144 are rotated to any desired time setting on indicia 128, such as eight o'clock a.m. and nine o'clock p.m. as illustrated in FIG. 4. The movement of pointers 134 and 144 causes relative rotation between cam plates 132 and 138 to adjust the size of the first cam portion 146 and the second cam portion 148. The nut 124 is then tightened and the cam plates 132 and 138 are rotated as a unit along with main shaft 114 by the timing mechanism 106.

During the time period prior to nine o'clock p.m. roller 150 on elongated member 90 will ride along the first cam portion 146 and coil spring 94 will urge bracket 82 in a counterclockwise direction into engagement with abutment means 96 to set the thermostat control point at 76°. When the time reaches nine o'clock p.m., the cam plates 132 and 138 will have rotated so that the roller 150 is moved into engagement with the depression or second cam portion 148. Thus, elongated member 90 will rotate clockwise about pin 84 and engage lug 88 to pivot bracket 82 in a clockwise direction into engagement with abutment means 104 and set the control point temperature at 70°. When the time becomes eight o'clock in the morning, roller 150 will move out of depression 148 and into engagement with first cam portion 146 to return the control point temperature to 76°. The control device will continue to cycle in the above described manner.

If it is desired to maintain the temperature at 76° after nine o'clock p.m., leg 156 of interrupting means 152 is merely pivoted to the left from the position illustrated in FIG. 1. This pivots cam surface 168 on leg 158 into engagement with the roller 150 and the cam surface guides the roller into indentation 160. Indentation 160 is disposed a sufficient radial distance from main shaft 114 to hold the roller 150 out of engagement with the first cam portion 146 and the second cam portion 148 and the bracket 82 remains in engagement with abutment means 96. The interrupting means 152 may be manually cancelled merely by moving leg 156 to its original position and the cycling will continue as though no interruption had occurred. If the interrupting means 152 is not manually cancelled, as the normal cycling continues projection 164 will engage the roller 150 and lift the same out of indentation 160 and the control device will again continue on its normal cycle. It is apparent that the interrupting means 152 is easily operable and does not place a drag on the timing mechanism 106.

Since the shift of the control point occurs only within the range of movement of the elongated member 90 between the first cam portion 146 and the second cam portion 148, the cam surfaces need not be precise and therefor these parts can be inexpensively made by stamping or casting. The sleeves 130 and 136 of the adjusting mechanism, being composed of separable interlocking sections, greatly facilitate assembly of the device.

While only two embodiments of this invention have been disclosed and described, it is apparent that there may be many changes in structure and operation without departing from the scope of this invention as defined by the following claims.

We claim:

1. In a control device, the combination comprising a support, a first elongated member rotatably mounted on said support, an abutment means disposed on either side of said first elongated member and adapted to limit the rotational movement thereof, a first resilient means connected to said first member and urging the same into engagement with one of said abutment means, a second elongated member rotatably mounted on said support, a second resilient means operatively connected to said second elongated member and urging the same into engagement with said first elongated member, said second resilient means being stronger than said first resilient means whereby said first elongated member is moved into engagement with the other of said abutment means, a shaft extending from said support, first and second partially circular members rotatably mounted on said shaft and adapted for engagement with said second elongated member, said first and second partially circular members having substantially the same radius and being mounted at their center curvature whereby they are cooperable to form an adjustable primary cam portion and a secondary cam portion, said second elongated member being moved out of engagement with said first elongated member upon engagement of said second elongated member with said primary cam portion whereby said first elongated member engages said one abutment means, and said second elongated member engaging said first elongated member upon engagement of said second elongated member with said secondary cam portion to cause engagement of said first elongated member with said other abutment means, and timing means operatively connected to said first and second partially circular members for operating the same whereby said first elongated member is maintained in engagement with said one abutment means for a first predetermined interval of time and maintained in engagement with said other abutment means for a second predetermined interval of time.

2. The combination of claim 1 including interrupting means operatively engaging said second elongated member to hold the same out of engagement with said first elongated member whereby said first elongated member engages said one abutment means during both said first and second predetermined intervals of time.

3. The combination of claim 2 including latch means on said interrupting means cooperating with said second elongated member to lock the two together.

4. The combination of claim 3 including a projection on one of said first and second partially circular members adapted for engagement with said second elongated member to release the same from said latch means.

5. In a control device, the combination comprising a support, a first elongated member rotatably mounted on said support, an abutment means disposed on either side of said first elongated member and adapted to limit the rotational movement thereof, a first resilient means connected to said first elongated member and urging the same into engagement with one of said abutment means, a second elongated member rotatably mounted on said support, a second resilient means operatively connected to said second elongated member and urging the same into engagement with said first elongated member, said second resilient means being stronger than said first resilient means whereby said first member is moved into engagement with said other of said abutment means, a shaft extending from said support, first and second partially circular members rotatably mounted on said shaft and adapted for engagement with said second elongated member, said first and second partially circular members cooperating to form a primary cam portion and a secondary cam portion, said second elongated member being moved out of engagement with said first elongated member upon engagement with said primary cam portion whereby said first elongated member engages said one abutment means, and said second elongated member engages said first elongated member upon engagement of said second elongated member with said secondary cam portion to cause engagement of said first elongated member with said other abutment means, timing means operatively connected to said first and second partially circular members and operating the same whereby said first elongated member is maintained in engagement with said one abutment means for a first predetermined interval of time and maintained in engagement with said other abutment means for a second predetermined interval of time, interrupting means rotatably mounted on said support and normally biased out of engagement with said second elongated member, said interrupting means operatively engaging said second elongated member to hold the same out of engagement with said first elongated member whereby said first elongated member engages said one abutment means during both said first and second predetermined intervals of time, and cover means for the control device connected to said support, a portion of said interrupting means extending through said cover means for external operation.

6. In a control device, the combination comprising a support having a shaft extending outwardly therefrom, first and second partially circular members mounted upon said shaft at their center of curvature for rotary adjustment relative to said shaft and to each other, said first and second members being of like radius, means for locking said members to said shaft at a selected position of rotative adjustment relative to each other whereby said first and said second member are cooperable about their peripheral surfaces to form a single complete circle or a portion thereof, timing means operatively connected to said shaft to rotate said shaft and said members as a unit, lever means resiliently biased into engagement with the peripheral surfaces of said members to be located in a first position when said lever means engages the circular peripheral portion of said members and to be located in a second position when said lever means engages the non-circular portion of the combined peripheral surfaces of said members, an interrupting arm mounted upon said shaft for movement into and out of engagement with said lever means, means biasing said interrupting arm out of engagement with said lever means, said interrupting arm having a radius greater than the radius of said partially circular members and being operable when engaged with said lever means to maintain said lever means out of engagement with said partially circular members to prevent movement of said lever means to said second position, and releasable latch means cooperable between said interrupting arm and said lever means for holding said interrupting means in engagement with said lever means against the action of said biasing means.

7. The combination of claim 6 including an enlarged radius portion on one of said partially circular members engageable with said lever means to disengage said latch means to permit said biasing means to return said lever means into engagement with said partially circular members.

References Cited in the file of this patent

UNITED STATES PATENTS

| | | |
|---|---|---|
| 1,171,955 | Honeywell | Feb. 15, 1916 |
| 1,460,853 | Lacke | July 3, 1923 |
| 2,194,243 | Kronmiller et al. | Mar. 19, 1940 |
| 2,324,164 | Kronmiller | July 13, 1943 |
| 2,419,077 | Isserstedt | Apr. 15, 1947 |

FOREIGN PATENTS

| | | |
|---|---|---|
| 419,378 | Great Britain | Nov. 12, 1934 |